(12) United States Patent
Dong et al.

(10) Patent No.: US 9,876,393 B2
(45) Date of Patent: Jan. 23, 2018

(54) DIRECT CURRENT (DC) VOLTAGE CONTROL METHOD AND APPARATUS

(71) Applicants: NR ELECTRIC CO., LTD, Nanjing (CN); NR ENGINEERING CO., LTD, Nanjing (CN)

(72) Inventors: Yunlong Dong, Nanjing (CN); Jie Tian, Nanjing (CN); Haiying Li, Nanjing (CN); Dongming Cao, Nanjing (CN)

(73) Assignees: NR ELECTRIC CO., LTD, Nanjing (CN); NR ENGINEERING CO., LTD, Nanjing (CN)

( * ) Notice: Subject to any disclaimer, the term of this patent is extended or adjusted under 35 U.S.C. 154(b) by 121 days.

(21) Appl. No.: 15/025,282

(22) PCT Filed: Sep. 25, 2014

(86) PCT No.: PCT/CN2014/087430
§ 371 (c)(1),
(2) Date: Mar. 28, 2016

(87) PCT Pub. No.: WO2015/043482
PCT Pub. Date: Apr. 2, 2015

(65) Prior Publication Data
US 2016/0226306 A1    Aug. 4, 2016

(30) Foreign Application Priority Data

Sep. 26, 2013 (CN) .......................... 2013 1 0446639

(51) Int. Cl.
| | | |
|---|---|---|
| *H01H 47/00* | (2006.01) |
| *H02J 13/00* | (2006.01) |
| *H02J 1/00* | (2006.01) |
| *H02J 3/36* | (2006.01) |

(52) U.S. Cl.
CPC ............ *H02J 13/0003* (2013.01); *H02J 1/00* (2013.01); *H02J 3/36* (2013.01); *Y02E 60/60* (2013.01)

(58) Field of Classification Search
CPC .................................................. H02J 13/0003
See application file for complete search history.

(56) References Cited

U.S. PATENT DOCUMENTS

2012/0026760 A1* 2/2012 Juhlin ...................... H02J 3/36
363/35

FOREIGN PATENT DOCUMENTS

| CN | 102820673 A | 12/2012 |
|---|---|---|
| CN | 102969733 A | 3/2013 |
| CN | 103138281 A | 6/2013 |
| CN | 103178539 A | 6/2013 |
| WO | WO2013020581 A1 | 2/2013 |

* cited by examiner

*Primary Examiner* — Daniel Puentes
(74) *Attorney, Agent, or Firm* — Gokalp Bayramoglu (57) ABSTRACT

The present invention discloses a direct current (DC) voltage control method. The present invention further discloses an apparatus for implementing the method. With the present invention, DC voltage oscillation of a system, which is caused when a DC voltage primary control station stops running, may be reduced.

12 Claims, 4 Drawing Sheets

DIRECT CURRENT (DC) VOLTAGE CONTROL METHOD AND APPARATUS

FIELD OF THE INVENTION

The present invention relates to a direct current (DC) voltage control technology, and in particular, to a DC voltage control method and apparatus in a multi-terminal flexible DC transmission system.

DESCRIPTION OF RELATED ART

With rapid development of voltage source converters (VSCs), a VSC-based DC transmission system becomes a main trend of the development of DC transmission systems. A multi-terminal flexible DC transmission system refers to a flexible DC transmission system including at least two VSCs under a same DC grid structure. The most outstanding feature of a multi-terminal flexible DC transmission system is that multiple power sources for supplying power and multiple drop points for receiving power can be achieved. As a more flexible and quick power transmission mode, multi-terminal flexible DC transmission has broad application prospects in fields such as connecting grids of new energies such as wind power, and constructing a city DC distribution network. Although a multi-terminal flexible DC transmission system, as compared with a two-terminal flexible DC transmission system, is more economical and flexible, coordinated control thereof is more complex. An important premise of a stable operation of a multi-terminal flexible DC transmission system is a stable DC voltage.

Figure 1:
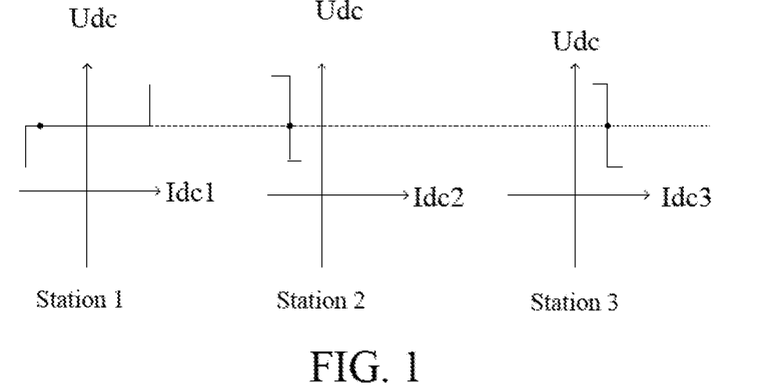
FIG. 1 is a schematic view of a principle of a single-point direct current (DC) voltage coordinated control scheme.

Currently, the following several coordinated control schemes for multi-terminal flexible DC transmission are proposed in industry:

(1) A single-point DC voltage control scheme,
where only one converter controls a DC voltage, and the remaining converters select to control active power or control a frequency. Descriptions are made by using three-terminal flexible DC transmission as an example. FIG. 1 is a schematic view of a principle of a single-point DC voltage coordinated control scheme. In FIG. 1, the horizontal coordinate indicates a DC current; the vertical coordinate indicates a DC voltage; station 1 controls the DC voltage; and station 2 and station 3 are subjected to active power control or frequency control. As shown in FIG. 1, the single-point DC voltage coordinated control principle is also applicable to other multi-terminal flexible DC transmission systems. Station 1 controls the DC voltage, functions to stabilize the DC voltage, and functions as a power slack bus. The remaining converters are subjected to the active power control or the frequency control.

An advantage of the single-point DC voltage control scheme is that a DC voltage is of good stability. A disadvantage of the single-point DC voltage control scheme is that when a DC voltage primary control station stops miming, the whole multi-terminal flexible DC transmission system exits from running due to the instability of the DV voltage, and therefore, the multi-terminal DC transmission system is of poor reliability and availability.

Figure 2:
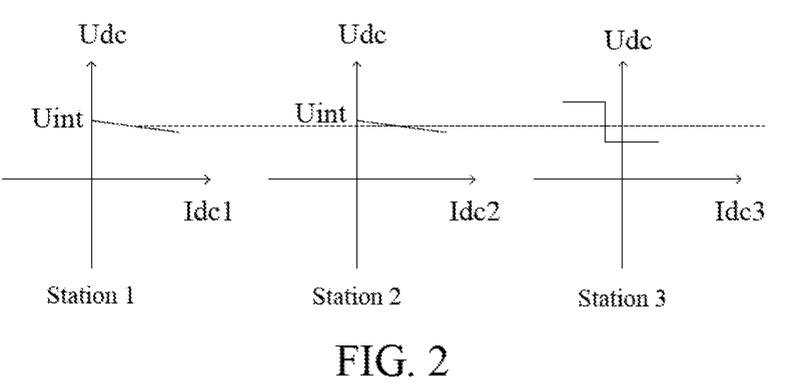
FIG. 2 is a schematic view of a principle of a multi-point DC voltage coordinated control scheme based on DC voltage droop.

(2) A multi-point DC voltage coordinated control scheme based on DC voltage droop,
where multiple converters with power adjustment capabilities that are connected to an alternating current (AC) power source run according to a droop-based DC voltage control scheme. Descriptions are made by using three-terminal flexible DC transmission as an example. FIG. 2 is a schematic view of a principle of a multi-point DC voltage coordinated control scheme based on DC voltage droop. In FIG. 2, the horizontal coordinate indicates a DC current; the vertical coordinate indicates a DC voltage; station 1 and station 2 adopt a droop-based DC voltage control scheme; and station 3 selects an active power control scheme or a frequency control scheme, as shown in FIG. 2. In FIG. 2, DC reference voltages of station 1 and station 2 are as shown in formula (1):

$$U_{dc1\_ref} = U_{int} - k_1 I_{dc1}$$

$$U_{dc2\_ref} = U_{int} - k_2 I_{dc2} \quad (1)$$

where $U_{int}$ is a rated value of a DC voltage of each of station 1 and station 2; $k_1$ is voltage-current droop of station 1; $k_2$ is voltage-current droop of station 2; $U_{dc1\_ref}$ is a DC voltage reference value of station 1; $U_{dc2\_ref}$ is a DC voltage reference value of station 2; $I_{dc1}$ is a current reference value of station 1; and $I_{dc2}$ is a current reference value of station 2. By means of control of a proportional relationship between droop $k_1$ and droop $k_2$, a ratio between active power absorbed or emitted by two converters with constant DC voltages is controlled.

By means of adoption of a multi-point DC voltage control scheme based on DC voltage droop, the power adjustment capability and stability of the whole multi-terminal system are improved. However, DC voltage control quality of a multi-point DC voltage control scheme based on DC voltage droop is poor, the DC voltage is not constant, and a single converter participating in the DC voltage control is incapable of implementing constant active power control.

(3) A multi-point DC voltage coordinated control scheme based on a DC voltage margin.

Figure 3:
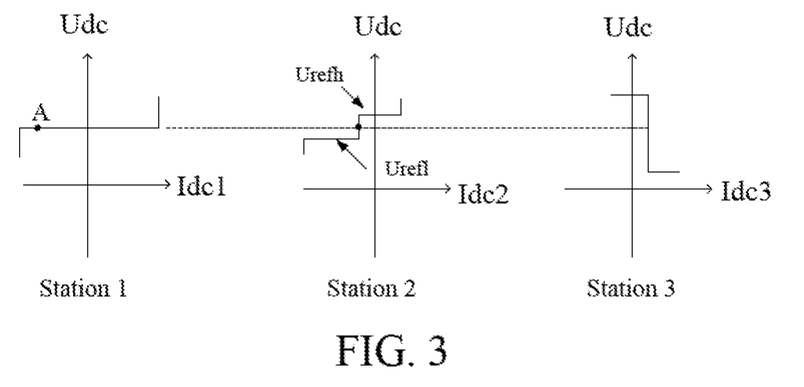
FIG. 3 is a schematic view of a principle of a multi-point DC voltage coordinated control scheme based on a DC voltage margin.

Three-terminal flexible DC transmission is used as an example, and a principle of a multi-point DC voltage coordinated control scheme based on a DC voltage margin adopted by the three-terminal flexible DC transmission is as shown in FIG. 3. In FIG. 3, the horizontal coordinate indicates a DC current; the vertical coordinate indicates a DC voltage; station 1 adopts constant DC voltage control; station 2 adopts a power controller with a DC voltage margin; and station 3 adopts constant active power control or constant frequency control. During normal miming, station 1 is designated as a DC voltage primary control station. When station 1 stops running, power of a DC network loses balance, and if power injected into the DC network is less than power emitted from the DC network, a DC voltage decreases. When station 2 detects that the DC voltage is less than a DC voltage constant $U_{ref1}$, station 2 switches from a current control scheme to constant DC voltage control within a range allowed by capacity, so as to stabilize the DC voltage of the flexible DC transmission system. The multi-point DC voltage coordinated control scheme based on a DC voltage margin, with respect to the single-point DC voltage coordinated control scheme, improves the stability of a multi-terminal flexible DC transmission system. However, in a multi-terminal flexible DC transmission system, if a quantity of secondary stations adopting DC voltage margin control is relatively large, because DC voltage margin values are in ascending order, a DC voltage margin at the time when a secondary station of a last sequence of performing taking over performs taking over is large, which affects an insulation performance of the system; and if the margin values in ascending order are set to be relatively small, wrongful taking over easily occurs. Besides, a power vacancy resulted from that a primary control station exits from miming may only be accommodated by as secondary station of a first sequence, and therefore, when the secondary station performs taking over, it is very likely to cause relatively severe oscillation of the system DC voltage, thereby causing a DC overvoltage fault or undervoltage fault.

SUMMARY OF THE INVENTION

Technical Problem

In view of the above, a main objective of embodiments of the present invention is to provide a DC voltage control method and apparatus in a multi-terminal flexible DC transmission system, so that when a DC voltage primary control station loses a DC voltage control function, a DC voltage secondary control station implements DC voltage control, and before the selected DC voltage secondary control station performs the DC voltage control, at least one DC voltage secondary control station enables an auxiliary control function to accommodate a current power vacancy.

Technical Solution

To achieve the foregoing objective, technical solutions of the present invention are implemented as follows:

A DC voltage control method is provided, which is applied to a multi-terminal flexible DC transmission system, where the multi-terminal flexible DC transmission system includes a DC voltage primary control station and at least one DC voltage secondary control station, and the method includes:
  determining, when it is determined that the DC voltage primary control station loses a DC voltage control function, whether the DC voltage primary control station can communicate with the DC voltage secondary control station, and if yes, sending, by the DC voltage primary control station, information about the DC voltage primary control station losing the DC voltage control function to the at least one DC voltage secondary control station and enabling a DC voltage control function of one DC voltage secondary control station, so as to adjust a DC voltage; before the DC voltage control function of the DC voltage secondary control station is enabled, if the DC voltage exceeds an operation range, enabling, by the at least one DC voltage secondary control station, a DC voltage auxiliary control function, so as to adjust emitted or absorbed active power; and
  when the DC voltage primary control station cannot communicate with all of or some of the at least one DC voltage secondary control stations, and if the DC voltage exceeds the operation range, enabling, by at least one DC voltage secondary control station, a DC voltage auxiliary control function, so as to adjust current emitted or absorbed active power, and determining, according to a policy, one DC voltage secondary control station to enable a DC voltage control function, so as to adjust the DC voltage.
Preferably, the method further includes:
  after the adjusted DC voltage returns to the operation range, making the DC voltage secondary control station that has the DC voltage auxiliary control function enabled exit from the DC voltage auxiliary control function, and restoring an active power command value of the DC voltage secondary control station that exits from the DC voltage auxiliary control function to a value before the DC voltage auxiliary control function is enabled.
Preferably, after the enabling, by the at least one DC voltage secondary control station, a DC voltage auxiliary control function, the method further includes:
  counting, by the DC voltage secondary control station that has the DC voltage auxiliary control function enabled, times of enabling the DC voltage auxiliary control function, or recording, by the DC voltage secondary control station that has the DC voltage auxiliary control function enabled, duration when the DC voltage auxiliary control function, is enabled, and determining, when a counted quantity or recorded duration exceeds a respective set threshold, one DC voltage secondary control station to enable a DC voltage control function, so as to adjust the DC voltage.
Preferably, the method further includes:
  setting, for the DC voltage secondary control stations, counted quantity thresholds of enabling DC voltage auxiliary control functions, where the counted quantity thresholds of enabling the DC voltage auxiliary control functions of the DC voltage secondary control stations are in ascending order according to a sequence of activating DC voltage control functions, or the counted quantity thresholds of enabling the DC voltage auxiliary control functions of the DC voltage secondary control stations are exactly the same, or the counted quantity thresholds of enabling the DC voltage auxiliary control functions of the DC voltage secondary control stations differ from each other, or some of the counted quantity thresholds of enabling the DC voltage auxiliary control functions of the DC voltage secondary control stations are the same.
Preferably, the method further includes:
  setting, for the DC voltage secondary control stations, recorded duration thresholds for duration when DC voltage auxiliary control functions are activated,
  where in a case in which operation ranges of DC voltages of the DC voltage secondary control stations are set to be the same, recorded duration thresholds, for duration when DC voltage auxiliary control functions of the DC voltage secondary control stations are activated, are in ascending order according to a sequence of activating DC voltage control functions; and if operation ranges of DC voltages of all the DC voltage secondary control stations in the DC voltage secondary control stations are set to be in ascending order according to a sequence of activating DC voltage control functions, the setting of recorded duration thresholds, for duration when the DC voltage control functions of the DC voltage secondary control stations are activated, is not limited.
Preferably, adjusting, by the DC voltage secondary control station that has the DC voltage control function enabled, the DC voltage includes:
  adjusting a DC voltage command value to a rated value.
Preferably, the method further includes:
  using, after an original DC voltage primary control station restores a DC voltage control function, the original DC voltage primary control station as a new DC voltage secondary control station.

A DC voltage control apparatus is provided, which is applied to the multi-terminal flexible DC transmission system, where the multi-terminal flexible DC transmission system includes a DC voltage primary control station and at least one DC voltage secondary control station, and the apparatus includes a first determining unit, a second determining unit, a sending unit, a first enabling unit, a third determining unit, a second enabling unit, a fourth determining unit, and a third enabling unit, where the first determining unit is configured to determine whether the DC voltage primary control station loses a DC voltage control function, and if yes, trigger the second determining unit;

the second determining unit is configured to determine whether the DC voltage primary control station can communicate with the at least one DC voltage secondary control station, and if yes, trigger the sending unit; and if not, trigger the fourth determining unit;

the sending unit is configured to send, by the DC voltage primary control station, information about the DC voltage primary control station losing the DC voltage control function to at least one DC voltage secondary control station;

the first enabling unit is configured to enable a DC voltage control function of a DC voltage secondary control station, so that the DC voltage secondary control station that has the DC voltage control function enabled adjusts a DC voltage;

the third determining unit is configured to determine, before the DC voltage control function of the DC voltage secondary control station is enabled, whether the DC voltage exceeds an operation range, and if yes, trigger the second enabling unit;

the second enabling unit is configured to enable a DC voltage auxiliary control function of at least one DC voltage secondary control station, so that the at least one DC voltage secondary control station that has the DC voltage auxiliary control function enabled adjusts emitted or absorbed active power;

the fourth determining unit is configured to determine whether the DC voltage exceeds the operation range, and if yes, trigger the third enabling unit; and the third enabling unit is configured to enable the DC voltage auxiliary control function of at least one DC voltage secondary control station, so that the at least one DC voltage secondary control station that has the DC voltage auxiliary control function enabled adjusts current emitted or absorbed active power, and determine, according to a policy, one DC voltage secondary control station to enable a DC voltage control function, so that the DC voltage secondary control station that has the DC voltage control function enabled adjusts the DC voltage.

Preferably, the apparatus further includes a first detection unit and an exit unit, where the first detection unit is configured to detect whether the adjusted DC voltage returns to the operation range, and if yes, trigger the exit unit; and the exit unit is configured to enable the DC voltage secondary control station that has the DC voltage auxiliary control function enabled to exit from the DC voltage auxiliary control function, and restore an active power command value of the DC voltage secondary control station that exits from the DC voltage auxiliary control function to a value before the DC voltage auxiliary control function is enabled.

Preferably, the third enabling unit includes an accumulation subunit, a determining subunit, and an enabling subunit, where the accumulation subunit is configured to count times of enabling the DC voltage auxiliary control function, or record duration when the DC voltage auxiliary control function is enabled;

the determining subunit is configured to determine whether a counted quantity or recorded duration exceeds a respective set threshold, and if yes, trigger the enabling subunit; and the enabling subunit is configured to determine one DC voltage secondary control station to enable a DC voltage control function, so that the DC voltage secondary control station that has the DC voltage control function enabled adjusts the DC voltage.

Preferably, the apparatus further includes:

a first setting unit, configured to set, for the DC voltage secondary control stations, counted quantity thresholds of enabling DC voltage auxiliary control functions, where the counted quantity thresholds of enabling the DC voltage auxiliary control functions of the DC voltage secondary control stations are in ascending order according to a sequence of activating DC voltage control functions, or the counted quantity thresholds of enabling the DC voltage auxiliary control functions of the DC voltage secondary control stations are exactly the same, or the counted quantity thresholds of enabling the DC voltage auxiliary control functions of the DC voltage secondary control stations differ from each other, or some of the counted quantity thresholds of enabling the DC voltage auxiliary control functions of the DC voltage secondary control stations are the same.

Preferably, the apparatus further includes:

a second setting unit, configured to set, for the DC voltage secondary control stations, the recorded duration thresholds for duration when the DC voltage auxiliary control functions are activated, where in a case in which operation ranges of DC voltages of the DC voltage secondary control stations are set to be the same, recorded duration thresholds, for duration when DC voltage auxiliary control functions of the DC voltage secondary control stations are activated, are in ascending order according to a sequence of activating DC voltage control functions; and if operation ranges of DC voltages of all the DC voltage secondary control stations in the DC voltage secondary control stations are set to be in ascending order according to a sequence of activating DC voltage control functions, the setting of recorded duration thresholds, for duration when DC voltage control functions of the DC voltage secondary control stations are activated, is not limited.

Preferably, the apparatus further includes a second detection unit and a control unit, where the second detection unit is configured to detect whether an original DC primary control station restores a DC voltage control function, and if yes, trigger the control unit; and the control unit is configured to use the original DC voltage primary control station as a new DC voltage secondary control station.

Advantageous Effect

The embodiments of the present invention are applied to a multi-terminal flexible DC transmission system, and disclose: determining, when it is determined that a DC voltage primary control station loses a DC voltage control function. Whether the DC voltage primary control station can communicate with at least one DC voltage secondary control station, and if yes, sending, by the DC voltage primary control station, information about the DC voltage primary control station losing the DC voltage control function to at least one DC voltage secondary control station and enabling a DC voltage control function of a DC voltage secondary control station of a first sequence, so as to adjust a DC voltage; before the DC voltage control function of the DC voltage secondary control station of the first sequence is enabled, if the DC voltage exceeds an operation range, enabling, by at least one DC voltage secondary control station, a DC voltage auxiliary control function, so as to adjust emitted or absorbed active power; and when the DC voltage primary control station cannot communicate with all of or some of the at least one DC voltage secondary control station, and if the DC voltage exceeds the operation range, enabling, by at least one DC voltage secondary control station, a DC voltage auxiliary control function, so as to adjust current emitted or absorbed active power, and determining, according to a policy, one DC voltage secondary control station to enable a DC voltage control function, so as to adjust the DC voltage. By means of adoption of the technical solutions of the embodiments of the present invention, a DC voltage may be effectively controlled, and after a DC voltage primary control station loses a DC voltage control capability, a DC voltage secondary control station may rapidly accommodate a power vacancy resulted from the exit of the primary control station, so as to reduce DC voltage oscillation of the system. In addition, a selected secondary station takes over control of the DC voltage, so as to maintain continuous running of a multi-terminal flexible DC transmission system.

DETAILED DESCRIPTION OF THE INVENTION

To make the objectives, technical solutions, and advantages of the present invention clearer, the following describes the present invention in detail by illustrating embodiments and referring to accompanying drawings.

Figure 4:
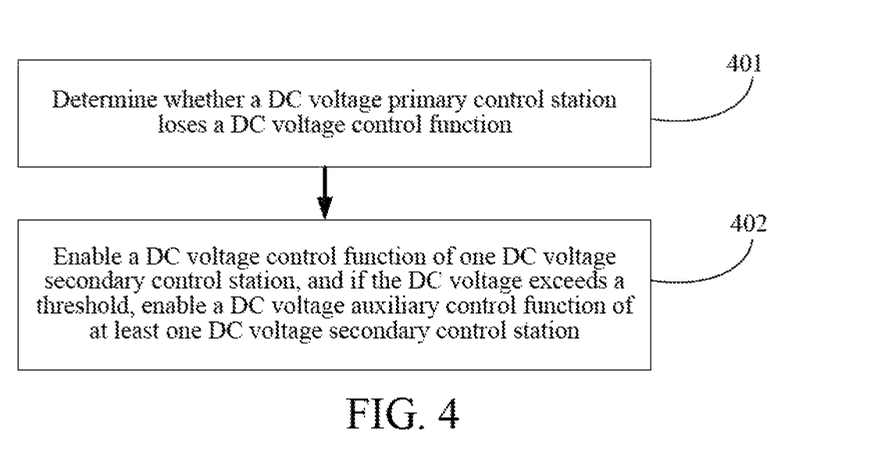
FIG. 4 is a schematic flowchart of a DC voltage control method of an embodiment of the present invention.

FIG. 4 is a schematic flowchart of a DC voltage control method of an embodiment of the present invention. The DC voltage control method of the embodiment of the present invention is applied to a multi-terminal flexible DC transmission system. The multi-terminal flexible DC transmission system includes a DC voltage primary control station and at least one DC voltage secondary control station. As shown in FIG. 4, the DC voltage control method of the embodiment of the present invention includes the following steps:

Step 401: Determine whether a DC voltage primary control station loses a DC voltage control function.

In a multi-terminal flexible DC transmission system, a DC voltage primary control station executes a DC voltage control function. However, the DC voltage primary control station may stop running due to various reasons, or the DC voltage control function thereof may suddenly fail. Moreover, the multi-terminal flexible DC transmission system necessarily requires DC voltage control. Therefore, the DC voltage control function of the DC voltage primary control station needs to be detected, so as to ensure the effectiveness of the DC voltage control function of the DC voltage primary control station. When the DC voltage primary control station thus. a DC voltage control function of a DC voltage secondary control station needs to be activated immediately, so as to ensure the DC voltage control function in the multi-terminal flexible DC transmission system, prevent the DC voltage from exceeding a set range, and prevent unnecessary damages from being caused.

Step 402: Enable a DC voltage control function of one DC voltage secondary control station, and if the DC voltage exceeds a threshold, enable a DC voltage auxiliary control function of at least one DC voltage secondary control station.

Specifically, when it is determined that the DC voltage primary control station loses a DC voltage control function, whether the DC voltage primary control station can communicate with the at least one DC voltage secondary control station is determined, and if yes, the DC voltage primary control station sends information about the DC voltage primary control station losing the DC voltage control function to a specific DC voltage secondary control station in the at least one DC voltage secondary control station, and a DC voltage control function of the DC voltage secondary control station is enabled. Before the DC voltage control function of the DC voltage secondary control station is enabled, if the DC voltage exceeds an operation range, at least one DC voltage secondary control station enables a DC voltage auxiliary control function, so as to adjust emitted or absorbed active power. When the DC voltage primary control station cannot communicate with all of or some of the at least one DC voltage secondary control station, and if the DC voltage exceeds the operation range, at least one DC voltage secondary control station enables a DC voltage auxiliary control function, so as to adjust current emitted or absorbed active power, and one DC voltage secondary control station to enable a DC voltage control function is determined according to a policy, so as to adjust the current emitted or absorbed active power of the DC voltage.

Specifically, duration, determined by the DC voltage secondary control station, of enabling the DC voltage control function may be set according to a requirement for DC voltage control, or may be any duration, which is not limited in the embodiment of the present invention.

On the basis of the earlier descriptions, the method of the embodiment of the present invention further includes:

after the adjusted DC voltage returns to the operation range, making the DC voltage secondary control station that has the DC voltage auxiliary control function enabled exit from the DC voltage auxiliary control function, and restoring an active power command value of the DC voltage secondary control station that exits from the DC voltage auxiliary control function to a value before the DC voltage auxiliary control function is enabled; and counting, by the DC voltage secondary control station that has the DC voltage auxiliary control function enabled, times of enabling the DC voltage auxiliary control function, or recording, by the DC voltage secondary control station that has the DC voltage auxiliary control function enabled, duration when the DC voltage auxiliary control function, is enabled, and determining, when a counted quantity or recorded duration exceeds a respective set threshold, one DC voltage secondary control station to enable a DC voltage control function, so as to adjust the DC voltage.

On the basis of the earlier descriptions, the method of the embodiment of the present invention further includes:

setting, for the DC voltage secondary control stations, counted quantity thresholds of enabling DC voltage auxiliary control functions, where the counted quantity thresholds of enabling the DC voltage auxiliary control functions of the DC voltage secondary control stations are in ascending order according to a sequence of activating DC voltage control functions, or the counted quantity thresholds of enabling the DC voltage auxiliary control functions of the DC voltage secondary control stations are exactly the same, or the counted quantity thresholds of enabling the DC voltage auxiliary control functions of the DC voltage secondary control stations differ from each other, or some of the counted quantity thresholds of enabling the DC voltage auxiliary control functions of the DC voltage secondary control stations are the same.

On the basis of the earlier descriptions, the method of the embodiment of the present invention further includes:

setting, for the DC voltage secondary control stations, recorded duration thresholds for duration when a DC voltage auxiliary control function is activated, where in a case in which operation ranges of DC voltages of the DC voltage secondary control stations are set to be the same, recorded duration thresholds, for duration when DC voltage auxiliary control functions of the DC voltage secondary control stations are activated, are in ascending order according to a sequence of activating DC voltage control functions; and if operation ranges of DC voltages of all the DC voltage secondary control stations in the DC voltage secondary control stations are set to be in ascending order according to a sequence of activating DC voltage control functions, the setting of recorded duration thresholds, for duration when the DC voltage control functions of the DC voltage secondary control stations are activated, is not limited.

In the embodiment of the present invention, a DC voltage command value of the DC voltage secondary control station that has the DC voltage control function enabled is as rated value.

On the basis of the earlier descriptions, the method of the embodiment of the present invention further includes:

using, after an original DC voltage primary control station restores a DC voltage control function, the original DC voltage primary control station as a new DC voltage secondary control station.

The essence of the technical solution of the embodiment of the present invention is further illustrated below with reference to specific examples.

With the DC voltage control method for a multi-terminal flexible DC transmission system provided in the present invention, a DC voltage may be effectively controlled, and after a DC voltage primary control station loses as DC voltage control capability, another DC voltage secondary control station may rapidly accommodate a power vacancy resulted from the exit of the primary control station, so as to reduce DC voltage oscillation of the system. Meanwhile, a secondary station of a first sequence takes over control of the DC voltage, so as to maintain continuous miming of the multi-terminal flexible DC transmission system.

The multi-terminal flexible DC transmission system includes a DC voltage primary control station and at least one DC voltage secondary control station. The DC voltage primary control station controls a DC voltage of the whole system, and all the remaining converters select active power control or frequency control. A DC voltage auxiliary control function is added to a DC voltage secondary control station. When the DC voltage primary control station loses a DC voltage control function, and if a resulted DC voltage exceeds a set operation range, the at least one DC voltage secondary control station rapidly adjusts emitted or absorbed active power, so as to jointly accommodate a power vacancy resulted from that the DC voltage primary control station loses the DC voltage control function. After the adjusted DC voltage returns to the operation range, the secondary station exits from the DC voltage auxiliary control function. At this time, if the power vacancy still exists, the DC voltage will exceed the operation range again, and a secondary station will launch DC voltage auxiliary control again. A specific taking over step includes the following two situations:

(1) In a case in which inter-station communication is effective, a DC voltage primary control station sends information about losing the DC voltage control to a DC voltage secondary control station, and after receiving the information, a secondary station of a first sequence of performing taking over rapidly takes over a DC voltage. Before the taking over succeeds, if the DC voltage exceeds an operation range, the DC voltage secondary control stations launch DC voltage auxiliary control functions. Other converters than the primary control station and the secondary stations maintain original control schemes unchanged.

(2) In a case in which inter-station communication is ineffective, a DC voltage secondary control station performs sequential taking over according to a quantity of times of launching an added DC voltage auxiliary control function, or performs sequential taking over after a delay counting from a first time of launching DC voltage auxiliary control. Other converters than the primary control station and the secondary stations maintain original control schemes unchanged.

After the adjusted DC voltage returns to the operation range, the secondary station exits from the DC voltage auxiliary control function, and the active power command value of the secondary station is restored to a value before the DC voltage auxiliary control is launched.

Constant values of DC voltage operation ranges of the DC voltage secondary control stations may be set to be the same, or may be set to be in ascending order according to a sequence of performing taking over. If the constant values of the DC voltage operation ranges are set to be the same, when the DC voltage operation ranges exceed the constant value, all the secondary stations launch DC voltage auxiliary control at the same time, and count quantifies of times of the launch. It is supposed that a secondary station of a first sequence performs DC voltage taking over when the counted quantity is $N\_1$, a secondary station of a second sequence performs DC voltage taking over when the counted quantity is $N\_2, \ldots$, and a secondary station of an nth sequence performs DC voltage taking over when the counted number is $N\_n$, where $N\_1 < N\_2 < \ldots < N\_n$. Constant values of DC voltage operation ranges may also be in ascending order according to a sequence of performing taking over by the secondary stations.

In the DC voltage control method of the embodiment of the present invention, taking over may also be performed by using a delay method. When time is counted from the first time when DC voltage auxiliary control is launched by a secondary station, in a case in which the DC voltage operation ranges are set to be the same, delays of secondary stations are set to be in ascending order according to a sequence of performing taking over. If the DC voltage operation ranges are set to be in ascending order, a delay may be independently set by each secondary station.

After a DC voltage secondary control station takes over control of a DC voltage, a DC voltage command value thereof is a rated value.

After a DC voltage secondary control station takes over control of a DC voltage, if an original DC voltage primary control station is restored to normal running, the original DC voltage primary control station is used as a new DC voltage secondary control station.

A specific implementation manner of DC voltage control for a multi-terminal flexible DC transmission system provided in the present invention is further described in detail below with reference to FIG. 5 (it is supposed that constant values of DC voltage operation ranges of all the secondary stations are set to be the same).

Figure 5:
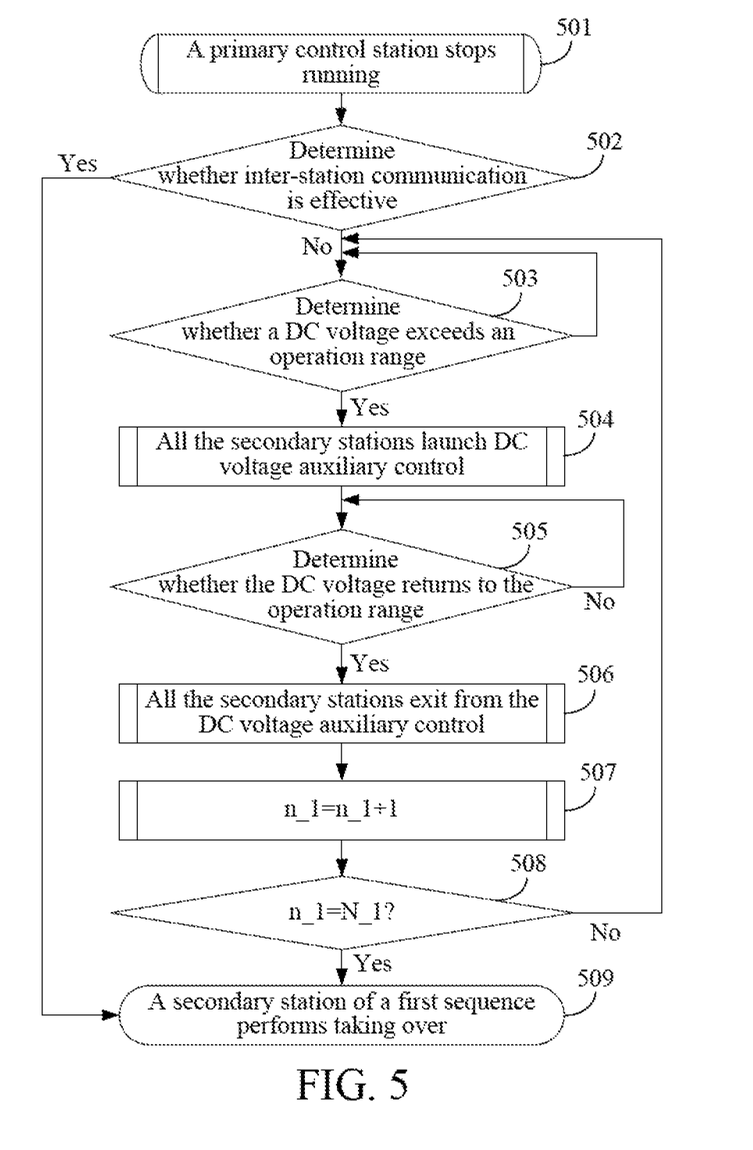
FIG. 5 is a schematic flowchart of a DC voltage control method of another embodiment of the present invention.

FIG. 5 is a schematic flowchart of a DC voltage control method of another embodiment of the present invention. As shown in FIG. 5, the DC voltage control method of this example includes the following steps:

Step 501: Detect a stop of running of a DC voltage primary control station.

When the primary control station stops running, a power vacancy occurs in a multi-terminal flexible DC transmission system due to the exit of the DC voltage primary control station. At this time, the DC voltage primary control station loses a DC voltage control capability, and therefore, a DC voltage increases or decreases. All the DC voltage secondary control stations perform real-time monitoring on the DC voltage.

Step 502: Determine whether communication between the DC voltage primary control station and a DC voltage secondary control station is effective, and if yes, perform Step 509: Directly implement, after a DC voltage secondary control station monitors, through inter-station communication, that the DC voltage primary control station loses a DC voltage control capability, taking over of control of the DC voltage; and if the inter-station communication is ineffective, perform Step 503.

Step 503: Determine whether the DC voltage exceeds an operation range, and if yes, perform Step 504; and if not, continue executing the DC voltage detection.

Step 504: Launch, after all the DC voltage secondary control stations monitor that the DC voltage exceeds the operation range, DC voltage auxiliary control, rapidly adjust respective emitted or absorbed active power, accommodate a power vacancy resulted from the exit of the DC voltage primary control station, and maintain the stability of the DC voltage.

In this embodiment, descriptions are made by using an example that all the DC voltage secondary control stations activate DC voltage auxiliary control functions before a DC voltage control function of a DC voltage secondary control station is enabled. In practice, the method may be implemented as long as at least one DC voltage secondary control station activates a DC voltage auxiliary control function. Certainly, a DC voltage secondary control station for activating a DC voltage auxiliary control function may be set in advance, and after it is monitored that a DC voltage exceeds an operation range, the DC voltage secondary control station that is set in advance activates the DC voltage auxiliary control function.

Specifically, when it is determined that the DC voltage primary control station loses a DC voltage control function, whether the DC voltage primary control station can communicate with at least one DC voltage secondary control station is further determined, and if yes, the DC voltage primary control station sends information about the DC voltage primary control station losing the DC voltage control function to a specific DC voltage secondary control station in the at least one DC voltage secondary control station, and a DC voltage control function of the DC voltage secondary control station is enabled. Before the DC voltage control function of the DC voltage secondary control station is enabled, if the DC voltage exceeds the operation range, at least one DC voltage secondary control station enables a DC voltage auxiliary control function, so as to adjust emitted or absorbed active power. When the DC voltage primary control station cannot communicate with all of or some of the DC voltage secondary control stations, and if the DC voltage exceeds the operation range, at least one DC voltage secondary control station enables a DC voltage auxiliary control function, so as to adjust current emitted or absorbed active power, and one DC voltage secondary control station to enable a DC voltage control function is determined according to a policy, so as to adjust the current emitted or absorbed active power of the DC voltage.

Step 505: Determine whether the DC voltage returns to the operation range. and if yes, perform Step 506; and if not, go back to continue executing the DC voltage control function.

Step 506: All the DC voltage secondary control stations exit from the DC voltage auxiliary control.

When enabling, by means of power adjustment, the DC voltage returns to the operation range, all the DC voltage secondary control stations exit from the DC voltage auxiliary control.

Step 507: A quantity of times of launching the DC voltage auxiliary control by a DC voltage secondary control station is added by one. After the DC voltage secondary control stations exit from the DC voltage auxiliary control, the DC voltage will increase or decrease again because the power vacancy of the multi-terminal DC transmission system still exists. When the DC voltage exceeds the operation range again, all the DC voltage secondary control stations launch the DC voltage auxiliary control functions again, and a quantity of the times of the launch of each of all the DC voltage secondary control stations is added by one again.

Step 508: Determine whether a quantity of times of executing the DC voltage auxiliary function by a DC voltage secondary control station exceeds a set value N_1.

The steps are performed repeatedly. When a quantity of times of launching DC voltage auxiliary control by a DC voltage secondary control station of a first sequence of performing taking over achieves the set value N_1, the secondary station of the first sequence performs taking over of control of the DC voltage, and maintains continuous stable running of the whole multi-terminal flexible DC transmission system, and if it does not achieve the set value N_1, continue executing the DC voltage auxiliary control function.

Step 509: The DC voltage secondary control station of the first sequence performs taking over, so as to implement taking over of control of the DC voltage.

Figure 6:
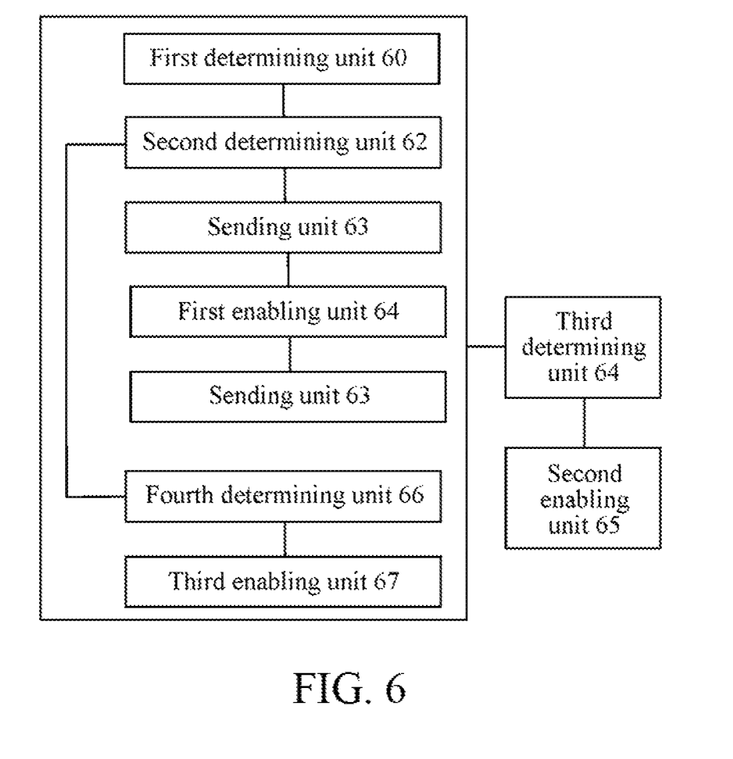
FIG. 6 is a schematic structural view of compositions of a DC voltage control apparatus of an embodiment of the present invention.

FIG. 6 is a schematic structural view of compositions of a DC voltage control apparatus of an embodiment of the present invention. The DC voltage control apparatus is applied to the multi-terminal flexible DC transmission system. The multi-terminal flexible DC transmission system includes a DC voltage primary control station and at least one DC voltage secondary control station. As shown in FIG. 6, the DC voltage control apparatus of the embodiment of the present invention includes a first determining unit 60, a second determining unit 61, a sending unit 62, a first enabling unit 63, a third determining unit 64, a second enabling unit 65, a fourth determining unit 66, and a third enabling unit 67, where the first determining unit 60 is configured to determine whether the DC voltage primary control station loses a DC voltage control function, and if yes, trigger the second determining unit 61;

the second determining unit 61 is configured to determine whether the DC voltage primary control station can communicate with the at least one DC voltage secondary control station, and if yes, trigger the sending unit 62; and if not, trigger the fourth determining unit 67;

the sending unit 62 is configured to send, by the DC voltage primary control station, information about the DC voltage primary control station losing the DC voltage control function to at least one DC voltage secondary control station, where the at least one DC voltage secondary control station may be a set DC voltage secondary control station of a first sequence;

the first enabling unit 63 is configured to enable a DC voltage control function of a DC voltage secondary control station, so that the DC voltage secondary control station that has the DC voltage control function enabled adjusts a DC voltage;

the third determining unit 64 is configured to determine, before the DC voltage control function of the DC voltage secondary control station is enabled, whether the DC voltage exceeds an operation range, and if yes, trigger the second enabling unit 65;

the second enabling unit 65 is configured to enable a DC voltage auxiliary control function of at least one DC voltage secondary control station, so that the at least one DC voltage secondary control station that has the DC voltage auxiliary control function enabled adjusts emitted or absorbed active power;

the fourth determining unit 66 is configured to determine whether the DC voltage exceeds the operation range, and if yes, trigger the third enabling unit; and the third enabling unit 67 is configured to enable the DC voltage auxiliary control function of at least one DC voltage secondary control station, so that the at least one DC voltage secondary control station that has the DC voltage auxiliary control function enabled adjusts current emitted or absorbed active power, and determine, according to a policy, one DC voltage secondary control station to enable a DC voltage control function, so that the DC voltage secondary control station that has the DC voltage control function enabled adjusts the DC voltage.

Adjusting, by the DC voltage secondary control station that has the DC voltage control function enabled, the DC voltage includes: adjusting a DC voltage command value to a rated value.

Adjusting the DC voltage indicates adjusting current emitted or absorbed active power of the DC voltage so as to accommodate a current power vacancy.

On the basis of the DC voltage control apparatus shown in FIG. 6, the DC voltage control apparatus of the embodiment of the present invention further includes: a first detection unit (not shown in FIG. 6) and an exit unit (not shown in FIG. 6), where the first detection unit is configured to detect whether the adjusted DC voltage returns to the operation range, and if yes, trigger the exit unit; and the exit unit is configured to enable the DC voltage secondary control station that has the DC voltage auxiliary control function enabled to exit from the DC voltage auxiliary control function, and restore an active power command value of the DC voltage secondary control station that exits from the DC voltage auxiliary control function to a value before the DC voltage auxiliary control function is enabled.

The foregoing third enabling unit 67 specifically includes an accumulation subunit (not shown in the figure), a determining subunit (not shown in the figure), and an enabling subunit (not shown in the figure), where the accumulation subunit is configured to count times of enabling the DC voltage auxiliary control function, or record duration when the DC voltage auxiliary control function is enabled;

the determining subunit is configured to determine whether a counted quantity or recorded duration exceeds a respective set threshold, and if yes, trigger the enabling subunit; and the enabling subunit is configured to determine one DC voltage secondary control station to enable a DC voltage control function, so that the DC voltage secondary control station that has the DC voltage control function enabled adjusts the DC voltage.

On the basis of the DC voltage control apparatus shown in FIG. 6, the DC voltage control apparatus of the embodiment of the present invention further includes: a first setting unit (not shown in FIG. 6), configured to set, for the DC voltage secondary control stations, counted quantity thresholds of enabling DC voltage auxiliary control functions, where the counted quantity thresholds of enabling the DC voltage auxiliary control functions of the DC voltage secondary control stations are in ascending order according to a sequence of activating DC voltage control functions, or the counted quantity thresholds of enabling the DC voltage auxiliary control functions of the DC voltage secondary control stations are exactly the same, or the counted quantity thresholds of enabling the DC voltage auxiliary control functions of the DC voltage secondary control stations differ from each other, or some of the counted quantity thresholds of enabling the DC voltage auxiliary control functions of the DC voltage secondary control stations are the same. On the basis of the DC voltage control apparatus shown in FIG. 6, the DC voltage control apparatus of the embodiment of the present invention further includes: a second setting unit (not shown in FIG. 6), configured to set, for the DC voltage secondary control stations, the recorded duration thresholds for duration when the DC voltage auxiliary control functions are activated, where in a case in which operation ranges of DC voltages of the DC voltage secondary control stations are set to be the same, recorded duration thresholds, for duration when DC voltage auxiliary control functions of the DC voltage secondary control stations are activated, are in ascending order according to a sequence of activating DC voltage control functions; and if operation ranges of DC voltages of all the DC voltage secondary control stations in the DC voltage secondary control stations are set to be in ascending order according to a sequence of activating DC voltage control functions, the setting of recorded duration thresholds, for duration when the DC voltage control functions of the DC voltage secondary control stations are activated, is not limited.

On the basis of the DC voltage control apparatus shown in FIG. 6, the DC voltage control apparatus of the embodiment of the present invention further includes:
  a second detection unit (not shown in FIG. 6) and a control unit (not shown in FIG. 6), where
  the second detection unit is configured to detect whether an original DC primary control station restores a DC voltage control function, and if yes, trigger the control unit; and
  the control unit is configured to use the original DC voltage primary control station as a new DC voltage secondary control station.

A person skilled in the art should understand that functions of processing units in a DC voltage control apparatus of the embodiments of the present invention may be understood with reference to relevant descriptions of the foregoing DC voltage control method, and processing units in an intelligent device of the embodiments of the present invention may be implemented by using an analog circuit for implementing the functions of the embodiments of the present invention, or may be implemented by running, in an intelligent device, software for executing the functions of the embodiments of the present invention.

The technical solutions described in the embodiments of the present invention may be combined arbitrarily on the premise of not conflicting with each other.

In the several embodiments provided in the present invention, it should be understood that the disclosed method and intelligent device may be implemented in other manners. The described device embodiments are merely exemplary. For example, the unit division is merely logical function division and may be other division in actual implementation. For example, multiple alas or components may be combined or integrated into another system, or some features may be ignored or not executed. In addition, the displayed or discussed mutual couplings or direct couplings or communication connections between components may be implemented through some interfaces. The indirect couplings or communication connections between the devices or units may be implemented in electronic, mechanical, or other forms.

The units described as separate parts may or may not be physically separate, and the parts displayed as units may or may not be physical units, may be located in one position, or may be distributed on multiple network units. A part of or all of the units may be selected according to actual needs to achieve the objectives of the solutions of the embodiments.

In addition, functional units in the embodiments of the present invention may be integrated into one processing unit, or each of the units may function as one unit separately, or two or more units may be integrated into one unit. The integrated unit may be implemented in the form of hardware, or may be implemented in the form of a combination of hardware and software functional units.

A person of ordinary skill in the art may understand that: all or some of the steps of the foregoing method embodiments may be implemented by a program instructing relevant hardware; the program may be stored in a computer readable storage medium; when the program is executed, the steps of the foregoing method embodiments are executed; and the foregoing storage medium includes: any medium that can store program code, such as a portable storage device, a read-only memory (ROM, Read-Only Memory), a random access memory (RAM, Random Access Memory), a magnetic disk, or an optical disc.

Alternatively, when the foregoing integrated units in the embodiments of the present invention are implemented in a form of a software functional module and sold or used as an independent product, the units may be stored in a computer-readable storage medium. Based on such an understanding, the technical solutions of the embodiments of the present invention essentially, or the part contributing to the prior art may be implemented in a form of a software product. The computer software product is stored in a storage medium and includes several instructions for instructing a computer device (which may be a personal computer, a server, a network device, or the like) to perform all or a part of the methods described in the embodiments of the present invention. The foregoing storage medium includes: any medium that can store program code, such as a portable storage device, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention.

What is claimed is:

1. A direct current (DC) voltage control method, applied to a multi-terminal flexible DC transmission system, wherein the multi-terminal flexible DC transmission system comprises a DC voltage primary control station and at least one DC voltage secondary control station, and the method comprises:
  determining, when it is determined that the DC voltage primary control station loses a DC voltage control function, whether the DC voltage primary control station can communicate with the DC voltage secondary control station, and if yes, sending, by the DC voltage primary control station, information about the DC voltage primary control station losing the DC voltage control function to the at least one DC voltage secondary control station and enabling a DC voltage control function of one of the at least one DC voltage secondary control station, so as to adjust the DC voltage; before the DC voltage control function of the DC voltage secondary control station is enabled, if the DC voltage exceeds an operation range, enabling, by the at least one DC voltage secondary control station, a DC voltage auxiliary control function, so as to adjust emitted or absorbed active power; and
  when the DC voltage primary control station cannot communicate with all of or some of the at least one DC voltage secondary control station, and if the DC voltage exceeds the operation range, enabling, by the at least one DC voltage secondary control station, a DC voltage auxiliary control function, so as to adjust current emitted or absorbed active power, and determining, according to a policy, one DC voltage secondary control station to enable a DC voltage control function, so as to adjust the DC voltage,
  wherein after the enabling, by the at least one DC voltage secondary control station, a DC voltage auxiliary control function, the method further comprises:
  counting, by the DC voltage secondary control station that has the DC voltage auxiliary control function enabled, times of enabling the DC voltage auxiliary control function, or recording, by the DC voltage secondary control station that has the DC voltage auxiliary control function enabled, duration when the DC voltage auxiliary control function, is enabled, and determining, when a counted quantity or recorded duration exceeds a respective set threshold, one DC voltage secondary control station to enable a DC voltage control function, so as to adjust the DC voltage.

2. The method according to claim 1, wherein the method further comprises:
after the adjusted DC voltage returns to the operation range, making the DC voltage secondary control station that has the DC voltage auxiliary control function enabled exit from the DC voltage auxiliary control function, and restoring an active power command value of the DC voltage secondary control station that exits from the DC voltage auxiliary control function to a value before the DC voltage auxiliary control function is enabled.

3. The method according to claim 1, wherein the method further comprises:
setting, for the DC voltage secondary control stations, counted quantity thresholds of enabling DC voltage auxiliary control functions, wherein the counted quantity thresholds of enabling the DC voltage auxiliary control functions of the DC voltage secondary control stations are in ascending order according to a sequence of activating DC voltage control functions, or the counted quantity thresholds of enabling the DC voltage auxiliary control functions of the DC voltage secondary control stations are exactly the same, or the counted quantity thresholds of enabling the DC voltage auxiliary control functions of the DC voltage secondary control stations differ from each other, or some of the counted quantity thresholds of enabling the DC voltage auxiliary control functions of the DC voltage secondary control stations are the same.

4. The method according to claim 1, wherein the method further comprises:
setting, for the DC voltage secondary control stations, recorded duration thresholds for duration when DC voltage auxiliary control functions are activated,
wherein in a case in which operation ranges of DC voltages of the DC voltage secondary control stations are set to be the same, recorded duration thresholds, for duration when DC voltage auxiliary control functions of the DC voltage secondary control stations are activated, are in ascending order according to a sequence of activating DC voltage control functions; and if operation ranges of DC voltages of all the DC voltage secondary control stations in the DC voltage secondary control stations are set to be in ascending order according to a sequence of activating DC voltage control functions, the setting of recorded duration thresholds, for duration when the DC voltage control functions of the DC voltage secondary control stations are activated, is not limited.

5. The method according to claim 1, wherein adjusting, by the DC voltage secondary control station that has the DC voltage control function enabled, the DC voltage comprises:
adjusting a DC voltage command value to a rated value.

6. The method according to claim 1, wherein the method further comprises:
using, after an original DC voltage primary control station restores a DC voltage control function, the original DC voltage primary control station as a new DC voltage secondary control station.

7. A direct current (DC) voltage control apparatus, applied to the multi-terminal flexible DC transmission system, wherein the multi-terminal flexible DC transmission system comprises a DC voltage primary control station and at least one DC voltage secondary control station, and
the apparatus comprises a first determining unit, a second determining unit, a sending unit, a first enabling unit, a third determining unit, a second enabling unit, a fourth determining unit, and a third enabling unit, wherein
the first determining unit is configured to determine whether the DC voltage primary control station loses a DC voltage control function, and if yes, trigger the second determining unit;
the second determining unit is configured to determine whether the DC voltage primary control station can communicate with the at least one DC voltage secondary control station, and if yes, trigger the sending unit; and if not, trigger the fourth determining unit;
the sending unit is configured to send, by the DC voltage primary control station, information about the DC voltage primary control station losing the DC voltage control function to at least one DC voltage secondary control station;
the first enabling unit is configured to enable a DC voltage control function of a DC voltage secondary control station, so that the DC voltage secondary control station that has the DC voltage control function enabled adjusts a DC voltage;
the third determining unit is configured to determine, before the DC voltage control function of the DC voltage secondary control station is enabled, whether the DC voltage exceeds an operation range, and if yes, trigger the second enabling unit;
the second enabling unit is configured to enable a DC voltage auxiliary control function of at least one DC voltage secondary control station, so that the at least one DC voltage secondary control station that has the DC voltage auxiliary control function enabled adjusts emitted or absorbed active power;
the fourth determining unit is configured to determine whether the DC voltage exceeds the operation range, and if yes, trigger the third enabling unit; and
the third enabling unit is configured to enable the DC voltage auxiliary control function of at least one DC voltage secondary control station, so that the at least one DC voltage secondary control station that has the DC voltage auxiliary control function enabled adjusts current emitted or absorbed active power, and determine, according to a policy, one DC voltage secondary control station to enable a DC voltage control function, so that the DC voltage secondary control station that has the DC voltage control function enabled adjusts the DC voltage.

8. The apparatus according to claim 7, wherein the apparatus further comprises: a first detection unit and an exit unit, wherein
the first detection unit is configured to detect whether the adjusted DC voltage returns to the operation range, and if yes, trigger the exit unit; and
the exit unit is configured to enable the DC voltage secondary control station that has the DC voltage auxiliary control function enabled to exit from the DC voltage auxiliary control function, and restore an active power command value of the DC voltage secondary control station that exits from the DC voltage auxiliary control function to a value before the DC voltage auxiliary control function is enabled.

9. The apparatus according to claim 8, wherein the third enabling unit comprises an accumulation subunit, a determining subunit, and an enabling subunit, wherein
the accumulation subunit is configured to count times of enabling the DC voltage auxiliary control function, or record duration when the DC voltage auxiliary control function is enabled;
the determining subunit is configured to determine whether a counted quantity or recorded duration exceeds a respective set threshold, and if yes, trigger the enabling subunit; and
the enabling subunit is configured to determine one DC voltage secondary control station to enable a DC voltage control function, so that the DC voltage secondary control station that has the DC voltage control function enabled adjusts the DC voltage.

10. The apparatus according to claim 8, wherein the apparatus further comprises:
a first setting unit, configured to set, for the DC voltage secondary control stations, counted quantity thresholds of enabling DC voltage auxiliary control functions, wherein the counted quantity thresholds of enabling the DC voltage auxiliary control functions of the DC voltage secondary control stations are in ascending order according to a sequence of activating DC voltage control functions, or the counted quantity thresholds of enabling the DC voltage auxiliary control functions of the DC voltage secondary control stations are exactly the same, or the counted quantity thresholds of enabling the DC voltage auxiliary control functions of the DC voltage secondary control stations differ from each other, or some of the counted quantity thresholds of enabling the DC voltage auxiliary control functions of the DC voltage secondary control stations are the same.

11. The apparatus according to claim 8, wherein the apparatus further comprises:
a second setting unit, configured to set, for the DC voltage secondary control stations, the recorded duration thresholds for duration when the DC voltage auxiliary control functions are activated,
wherein in a case in which operation ranges of DC voltages of the DC voltage secondary control stations are set to be the same, recorded duration thresholds, for duration when DC voltage auxiliary control functions of the DC voltage secondary control stations are activated, are in ascending order according to a sequence of activating DC voltage control functions; and if operation ranges of DC voltages of all the DC voltage secondary control stations in the DC voltage secondary control stations are set to be in ascending order according to a sequence of activating DC voltage control functions, the setting of recorded duration thresholds, for duration when DC voltage control functions of the DC voltage secondary control stations are activated, is not limited.

12. The apparatus according to claim 8, wherein the apparatus further comprises: a second detection unit and as control unit, wherein
the second detection unit is configured to detect whether an original DC primary control station restores a DC voltage control function, and if yes, trigger the control unit; and
the control unit is configured to use the original DC voltage primary control station as a new DC voltage secondary control station.

\* \* \* \* \*